United States Patent [19]
Quinn

[11] 3,785,405
[45] Jan. 15, 1974

[54] AERODYNAMIC NOZZLES IN RECTANGULAR DUCT
[75] Inventor: Brian P. Quinn, Dayton, Ohio
[73] Assignee: The United States of America as represented by the Secretary of the Air Force, Washington, D.C.
[22] Filed: Feb. 23, 1972
[21] Appl. No.: 228,682

[52] U.S. Cl. .................................. 138/39, 137/13
[51] Int. Cl. ............................................ F15d 1/02
[58] Field of Search .............................. 138/39, 37; 239/265.11, 265.17; 73/147; 137/13; 181/33 H, 33 HC

[56] References Cited
UNITED STATES PATENTS
3,396,738   8/1968   Heskestad ..................... 138/39 X
2,853,852   9/1958   Bodine, Jr. ..................... 138/40 X
3,695,290   10/1972  Evans ............................ 137/13 X Primary Examiner—Charles A. Ruehl
Attorney—Harry A. Herbert, Jr. et al.

[57] ABSTRACT

A rectangular duct having a gas flow therethrough wherein there is a tendency for the gas flow to separate from a wall of the duct having an aerodynamic nozzle positioned adjacent the wall that results in a downwash of gas which deters separation. In a duct wherein a plurality of nozzles provide a primary flow of air in a rectangular duct wherein ambient air is entrained and mixed with the primary air, the tip vortices from the aerodynamic nozzles positioned adjacent the duct end walls enhance the mixing and cancel the vortices naturally forming at the juncture of the side walls and the end walls.

3 Claims, 8 Drawing Figures 3,785,405

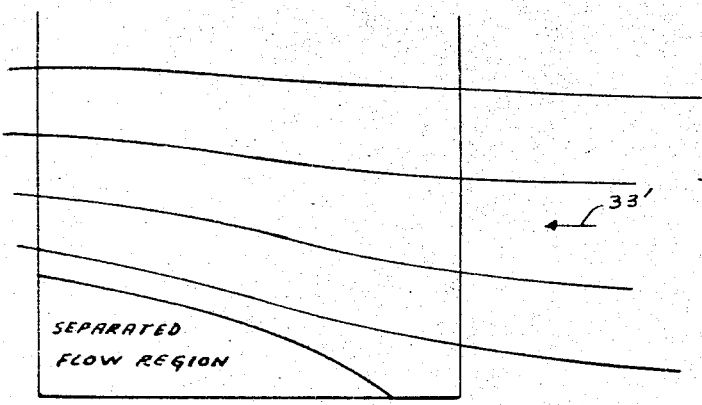
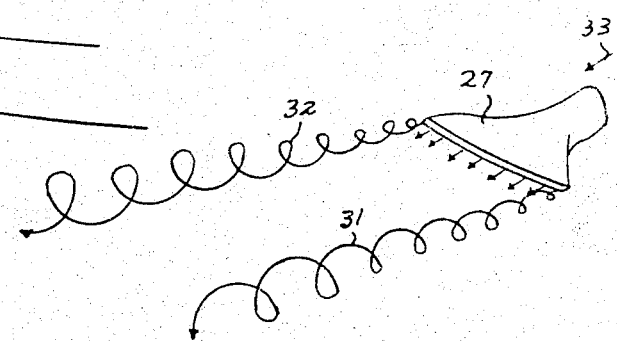
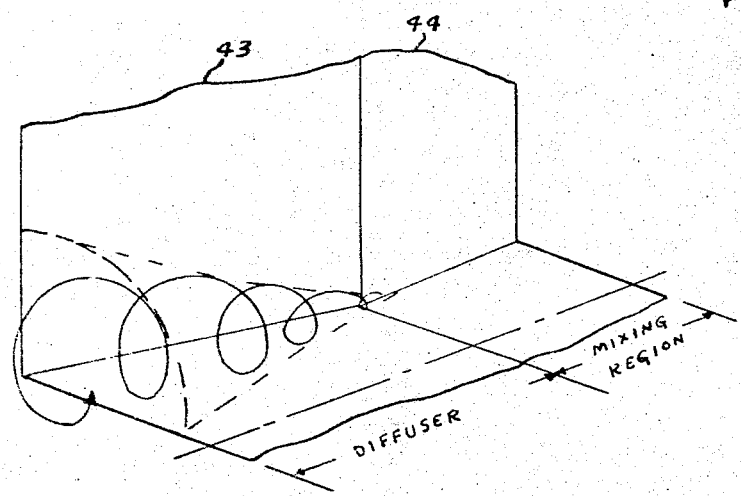
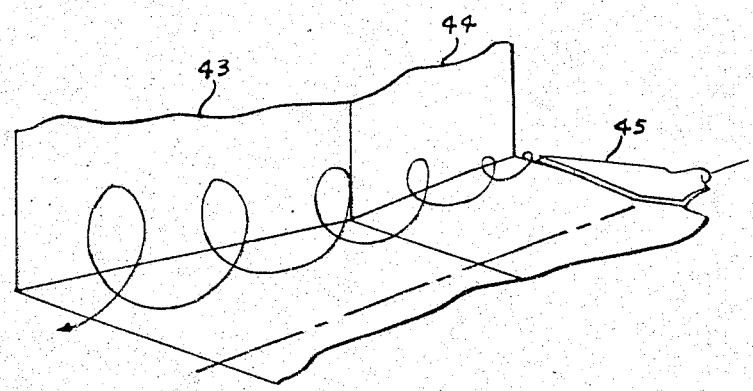

AERODYNAMIC NOZZLES IN RECTANGULAR DUCT

BACKGROUND OF THE INVENTION

In flows through rectangular ducts, there are three dimensional effects which result in the formation of streamwise vortices on the duct corners and separation of the flow from the duct walls. For example, in some V/STOL aircraft, use is made of thrust augmenting ejectors as primary lifting devices. Nozzles are provided in rectangular ducts wherein the ambient air is entrained and mixed with the primary air from the nozzles and then diffused to ambient pressure. The thrust produced in such ejector systems could be greatly increased if wall separation were prevented and if the media were mixed properly.

BRIEF SUMMARY OF THE INVENTION

According to this invention, nozzles are provided which are in the form of air foils whose characteristics in the secondary, or entrained, flow produce a lifting force. The lifting force is manifest in the air as a downwash which deters separation. A pair of counter rotating tip vortices are produced which enhance mixing. When nozzles are used on the duct end walls, the tip vortices produced by the nozzle have a sense of rotation that cancels the streamwise vortices naturally forming in the juncture of the end and side walls.

IN THE DRAWINGS

FIG. 3 is a schematic illustration showing flow separation from the end wall of a rectangular channel.

FIG. 4 is a schematic illustration showing tip vortices from an aerodynamic nozzle.

FIG. 7 is a cutaway schematic illustration showing a mixer and diffuser.

FIG. 8 shows an aerodynamic nozzle used in the device of FIG. 7.

Figure 1:
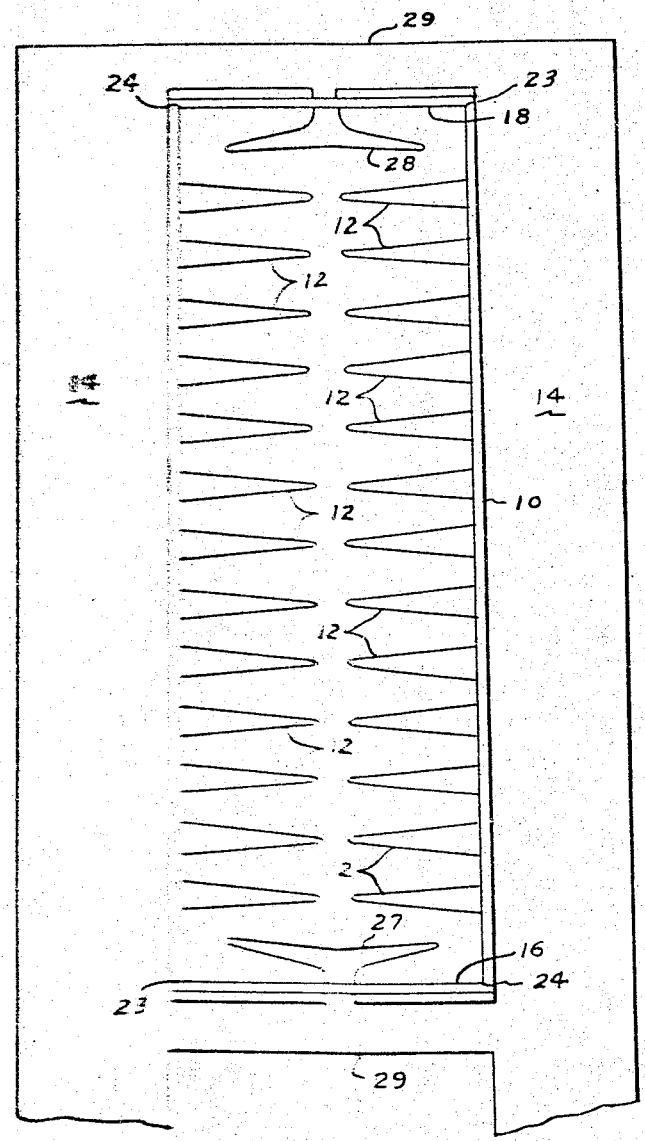
FIG. 1 is an end view of a flow channel with thrust augmenting nozzles, according to the invention.
Figure 2:
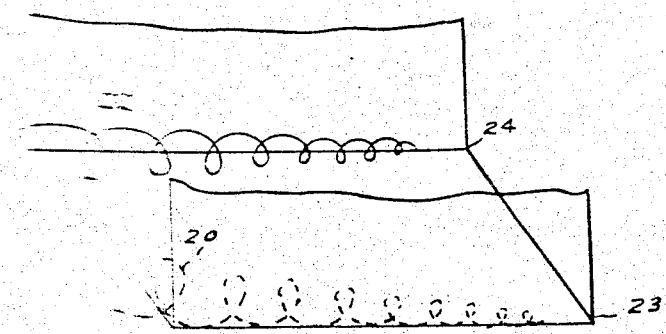
FIG. 2 is a schematic illustration showing vortices normally formed adjacent the end wall of a rectangular channel.

Reference is now made to FIG. 1 of the drawing wherein a rectangular duct 10, such as may be found in a V/STOL aircraft or a wind tunnel, has primary flow through the duct provided by a plurality of nozzles 12 which are supplied by conduits 14. At the ends 16 and 18 counter rotating vortices 20 and 22, as shown in FIG. 2, are normally formed in the corners 23 and 24 which leads to separated flow, as shown in FIG. 3.

A pair of aerodynamic nozzles 27 and 28, supplied from conduits 29, produce a lifting force that results in a downwash which deters separation. A pair of counter rotating tip vortices 31 and 32, shown in FIG. 4, enhance mixing of the primary gas flow from nozzles 27 and 28 with the secondary gas flow indicated by arrow 33. The vortices 31 and 32 have a sense of rotation that cancels vortices 20 and 22, respectively.

With respect to the end wall, the airfoils are positioned at an angle between 4° and 12° which provides a similar angle of attack relative to the unseparated entrained air. The downwash is further enhanced by inclining the jet from the airfoil at a greater angle, relative to the wall, e.g., between 8° and 16°.

In the operation of the device, air is supplied to nozzles 12 from conduits 14. As the primary gas leaves the nozzle, secondary air is entrained and mixed with the primary air. Without the nozzles 27 and 28, vortices 20 and 22 would be formed in the corners adjacent end walls 16 and 18 which lead to separation, as shown in FIG. 3, with the direction of flow shown by arrow 33'. The aerodynamic shaped nozzles 27 and 28 provide a downwash which deters separation. These also provide tip vortices 31 and 32, as shown in FIG. 4, which enhance mixing of the primary and secondary air flow. The tip vortices also cancel the vortices normally formed in the corners adjacent end walls 16 and 18.

Figure 6:
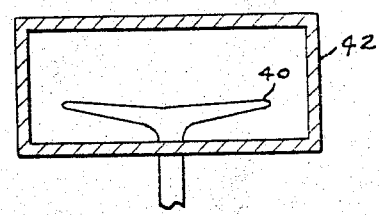
FIG. 6 is a sectional view of the device of FIG. 5 along the line 6—6.
Figure 5:
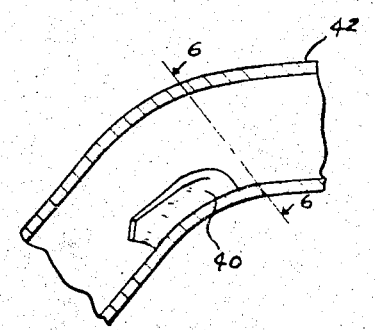
FIG. 5 is a schematic illustration of an aerodynamic nozzle in a bent section of a gas duct.

Though the aerodynamic nozzles have been described for use to prevent separation from the end walls of rectangular ducts, it can be used any place where vorticles and separation of a gas from the wall occur. One such place where separation tends to occur is in the bend in rectangular ducts, as shown in FIGS. 5 and 6. In this device, the aerodynamic nozzle 40 is placed at the bend in a duct 42.

FIG. 7 shows how vortices and separated flow can occur in a diffuser channel 43 following a mixing region 44. An aerodynamic nozzle 45 can also be used in this type of device, as shown in FIG. 8, wherein the tip vortices from aerodynamic nozzle 45 cancel the vortices normally formed in such a diffuser section.

There is thus provided an apparatus which will overcome the problem of poor mixing and flow separation in rectangular ducts.

I claim:

1. In combination with a rectangular duct having means for providing a flow of gas through the duct wherein the flow tends to separate from at least one of the walls of the duct, apparatus for detering separation of the gas from said at least one wall, comprising: means for providing a downwash of gas toward said wall; said means for providing a downwash of gas toward said wall including an aerodynamic nozzle, having an elongated exit aperture, and means for providing a primary flow of gas from said nozzle, whereby tip vortices formed at the ends of said aperture aid in mixing of primary flow gas from said nozzle with entrained secondary flow ambient gas.

2. The device as recited in claim 1 wherein said means for providing a flow of gas through the duct includes a plurality of nozzles positioned in spaced relation along the sides of the duct with means for providing a primary flow of gas from said nozzles which entrains secondary flow ambient gas wherein the flow tends to form vortices in the corners adjacent the end walls and the flow tends to separate from the end walls of said duct; said aerodynamic nozzle being positioned adjacent each of the end walls of said duct whereby tip vortices aid in cancelling the vortices produced in the duct corners and deter separation of flow from the end walls.

3. In combination with a rectangular duct having means for providing a flow of gas through the duct wherein the flow tends to separate from at least one of the walls of the duct, apparatus for detering separation of the gas from said at least one wall, comprising: means for providing a downwash of gas toward said wall; said duct including a bend wherein flow tends to separate from the inside wall of the bend; said means for providing a downwash of gas including an aerodynamic nozzle positioned adjacent the inside wall of the bend, said nozzle having an elongated aperture for directing a primary flow of gas within said duct.

* * * * *